(12) United States Patent
Ahmed et al.

(10) Patent No.: US 8,548,073 B2
(45) Date of Patent: Oct. 1, 2013

(54) METHOD, APPARATUS AND SYSTEM FOR USING GUARD TONES IN OFDM SYSTEMS FOR INCREASING DATA RATES AND IMPROVING ROBUSTNESS

(75) Inventors: Nadeem Ahmed, Allen, TX (US); Brian Joseph, McKinney, TX (US); Chris Heegard, Sugarloaf, FL (US)

(73) Assignee: QUALCOMM Incorporated, San Diego, CA (US)

( * ) Notice: Subject to any disclaimer, the term of this patent is extended or adjusted under 35 U.S.C. 154(b) by 701 days.

(21) Appl. No.: 12/400,598

(22) Filed: Mar. 9, 2009

(65) Prior Publication Data

US 2009/0232238 A1 Sep. 17, 2009

Related U.S. Application Data

(60) Provisional application No. 61/036,849, filed on Mar. 14, 2008.

(51) Int. Cl.
 *H04K 1/10* (2006.01)
(52) U.S. Cl.
 USPC ........... 375/260; 375/308; 375/340; 370/208; 370/528
(58) Field of Classification Search
 USPC ................. 375/260, 308, 340; 370/208, 210, 370/329, 343, 528; 714/748, 749, 790
 See application file for complete search history.

(56) References Cited

U.S. PATENT DOCUMENTS

| 7,051,269 | B1 | 5/2006 | Hindelang et al. |
| 7,650,560 | B2 * | 1/2010 | Mo et al. ................. 714/790 |
| 7,756,002 | B2 * | 7/2010 | Batra et al. ................ 370/208 |
| 2005/0122896 | A1 | 6/2005 | Song et al. |
| 2005/0271088 | A1 * | 12/2005 | Shoemake et al. ............ 370/528 |
| 2007/0009053 | A1 | 1/2007 | Laroia et al. |
| 2008/0279293 | A1 * | 11/2008 | Gaddam et al. ............... 375/260 |

FOREIGN PATENT DOCUMENTS

| CN | 101129012 A | 2/2008 |
| EP | 1557994 A2 | 7/2005 |
| JP | 2002542645 A | 12/2002 |
| WO | 0062425 A1 | 10/2000 |
| WO | 2006079081 | 7/2006 |
| WO | WO2007049256 | 5/2007 |

OTHER PUBLICATIONS

Standard ECMA-368, 3rd Edition/Dec. 2008. "High Rate Ultra Wideband PHY and MAC Standard." Section 10.10.3, "Guard subcarriers", p. 72.
International Search Report and the Written Opinion-PCT/US2009/037016, International Search Authority-Taiwan Patent Office-Nov. 30, 2009.

(Continued)

*Primary Examiner* — Daniel Washburn
*Assistant Examiner* — Fitwi Hailegiorgis
(74) *Attorney, Agent, or Firm* — Nicholas J. Pauley; Sam Talpalatsky; Joseph Agusta

(57) ABSTRACT

The present disclosure provides a method, apparatus, and system for increasing data rates and improving robustness in a wireless communication system. The method comprises identifying a set of guard tones for wireless Orthogonal Frequency Division Multiplexing (OFDM) signals, encoding data for OFDM transmission, identifying a preferred puncture pattern to puncture the encoded data, puncturing the encoded data with the preferred puncture pattern, and transmitting the punctured encoded data, wherein a portion of the punctured encoded data is transmitted on a portion of the set of guard tones.

16 Claims, 15 Drawing Sheets

(56) References Cited

OTHER PUBLICATIONS

IEEE Std 802.11a-1999, Part 11: Wireless LAN Medium Access Control (MAC) and Physical Layer (PHY) specifications: High-speed Physical Layer in the 5GHZ Band, Approved Sep. 16, 1999, IEEE-SA Standards Board, New York, NY.

Taiwan Search Report—TW098108483—TIPO—Jul. 16, 2012.

* cited by examiner $$\text{punctPattern} = \begin{bmatrix} 1 \\ 0 \\ 1 \end{bmatrix}$$

FIG. 6

$$\text{punctPattern} = \begin{bmatrix} 1 & 0 & 1 & 0 & 1 \\ 1 & 0 & 1 & 0 & 1 \\ 0 & 1 & 0 & 1 & 0 \end{bmatrix}$$

FIG. 7

$$\text{punctPattern} = \begin{bmatrix} 1 & 0 & 0 \\ 1 & 0 & 0 \\ 0 & 1 & 1 \end{bmatrix}$$

FIG. 8

$$\text{punctPattern} = \begin{bmatrix} 1 & 1 \\ 0 & 0 \\ 1 & 0 \end{bmatrix}$$

FIG. 9

$$\text{punctPattern} = \begin{bmatrix} 0 & 1 & 1 & 1 \\ 1 & 0 & 0 & 0 \\ 0 & 1 & 0 & 0 \end{bmatrix}$$

FIG. 10

$$\text{punctPattern} = \begin{bmatrix} 1 & 1 & 1 & 1 & 1 \\ 1 & 0 & 0 & 0 & 0 \\ 1 & 1 & 1 & 1 & 1 \end{bmatrix}$$

FIG. 11

$$\text{punctPattern} = \begin{bmatrix} 1 & 0 & 0 & 1 & 0 & 0 & 1 & 1 \\ 1 & 0 & 0 & 1 & 0 & 0 & 1 & 0 \\ 0 & 1 & 1 & 0 & 1 & 1 & 0 & 0 \end{bmatrix}$$

$$\text{punctPattern} = \begin{bmatrix} 1 & 1 & 1 & 1 & 1 \\ 1303 \rightarrow (1) & 0 & 0 & 0 & 0 \\ 1 & 1 & 1 & 1 & 1 \end{bmatrix}$$

1304

$$\text{dataPP} = \begin{bmatrix} 1 & 1 & 1 & 1 & 1 \\ 0 & 0 & 0 & 0 & 0 \\ 1 & 1 & 1 & 1 & 1 \end{bmatrix}$$

1306

$$\text{guardPP} = \begin{bmatrix} 0 & 0 & 0 & 0 & 0 \\ 1308 \rightarrow (1) & 0 & 0 & 0 & 0 \\ 0 & 0 & 0 & 0 & 0 \end{bmatrix}$$

FIG. 13

FIG. 14 punctPattern = [ 3×24 binary matrix ]

dataPP = [ 3×24 binary matrix ]

guardPP = [ 3×24 binary matrix ]

punctPattern =

$$\begin{bmatrix} 1 & 1 & 0 & 1 & 1 & 0 & 1 & 0 & 0 & 1 & 0 & 0 & 1 & 0 & 0 \\ 1 & 0 & 0 & 1 & 0 & 0 & 1 & 0 & 0 & 1 & 0 & 0 & 1 & 0 & 0 \\ 0 & 1 & 1 & 0 & 1 & 1 & 0 & 1 & 1 & 0 & 1 & 1 & 0 & 1 & 1 \end{bmatrix}$$

dataPP =

$$\begin{bmatrix} 1 & 0 & 0 & 1 & 0 & 0 & 1 & 0 & 0 & 1 & 0 & 0 & 1 & 0 & 0 \\ 1 & 0 & 0 & 1 & 0 & 0 & 1 & 0 & 0 & 1 & 0 & 0 & 1 & 0 & 0 \\ 0 & 1 & 1 & 0 & 1 & 1 & 0 & 1 & 1 & 0 & 1 & 1 & 0 & 1 & 1 \end{bmatrix}$$

guardPP =

$$\begin{bmatrix} 0 & 1 & 0 & 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 \end{bmatrix}$$

FIG. 15 punctPattern =

$$\begin{bmatrix} 1 & 1 & 1 & 1 & 1 & 1 & 1 & 1 & 1 & 1 & 1 & 1 & 1 & 1 & 1 & 1 & 1 & 1 & 1 & 1 \\ 0 & 1 & 0 & 0 & 0 & 0 & 0 & 0 & 0 & 0 & 0 & 0 & 0 & 0 & 0 & 0 & 0 & 0 & 0 & 0 \\ 1 & 0 & 1 & 0 & 1 & 0 & 1 & 0 & 1 & 0 & 1 & 1 & 1 & 0 & 1 & 1 & 1 & 0 & 1 & 0 \end{bmatrix}$$

dataPP =

$$\begin{bmatrix} 1 & 1 & 1 & 1 & 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 0 & 0 & 0 & 0 & 0 & 0 & 0 & 0 & 0 & 0 & 0 & 0 \\ 1 & 0 & 1 & 0 & 1 & 0 & 1 & 0 & 1 & 0 & 1 & 0 & 1 & 0 & 1 & 0 & 1 & 0 & 1 & 0 \end{bmatrix}$$

guardPP =

$$\begin{bmatrix} 0 & 0 & 0 & 0 & 0 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 1 & 0 & 0 & 0 & 0 \end{bmatrix}$$

FIG. 16

$$\text{punctPattern} = \begin{bmatrix} 0 & 1 & 1 & 1 & 0 & 1 & 1 & 1 \\ 1 & 0 & 0 & 0 & 1 & 0 & 0 & 0 \\ 0 & 1 & 1 & 0 & 0 & 1 & 0 & 0 \end{bmatrix}$$

$$\text{dataPP} = \begin{bmatrix} 0 & 1 & 1 & 1 & 0 & 1 & 1 & 1 \\ 1 & 0 & 0 & 0 & 1 & 0 & 0 & 0 \\ 0 & 1 & 0 & 0 & 0 & 1 & 0 & 0 \end{bmatrix}$$

$$\text{guardPP} = \begin{bmatrix} 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \end{bmatrix}$$

FIG. 17

METHOD, APPARATUS AND SYSTEM FOR USING GUARD TONES IN OFDM SYSTEMS FOR INCREASING DATA RATES AND IMPROVING ROBUSTNESS

CLAIM OF PRIORITY UNDER 35 U.S.C. §119

The present Application for Patent claims benefit of U.S. Provisional Patent Application Ser. No. 61/036,849 filed Mar. 14, 2008, and assigned to the assignee hereof and hereby expressly incorporated by reference herein.

TECHNICAL FIELD

The present disclosure generally relates to wireless communications systems, such as a multi-band OFDM (Orthogonal Frequency Division Multiplexing) communication system. More specifically, the present disclosure relates to a method for increasing data rates and system robustness by using depunctured bits on guard tones while preserving the WiMedia data flow on data tones.

BACKGROUND

In a conventional serial data system, symbols may be transmitted sequentially, with the frequency spectrum of each data symbol allowed to occupy the entire bandwidth. A parallel data transmission system is one in which several sequential streams of data may be transmitted simultaneously. In a parallel system, the spectrum of an individual data element may only occupy a small part of the available bandwidth.

In a classic parallel data system, the total signal frequency band may be divided into N overlapping frequency subchannels. Each subchannel may be modulated with a separate symbol. The subchannels may then be multiplexed.

Orthogonal signals may be separated at the receiver by using correlation techniques, eliminating inter-symbol interference. This may be achieved by carefully selecting carrier spacing so as to let the carrier spacing equal the reciprocal of the useful symbol period. Orthogonal Frequency Division Multiplexing (OFDM) is a form of multicarrier modulation wherein carrier spacing may be selected so that each subcarrier is orthogonal to the other subcarriers.

This orthogonality may avoid adjacent channel interference and may prevent the demodulators from seeing frequencies other than their own. The benefits of OFDM may be high spectral efficiency, resiliency to Radio Frequency (RF) interference, and lower multi-path distortion.

In OFDM, the subcarrier pulse used for transmission may be chosen to be rectangular. This has the advantage that the task of pulse forming and modulation may be performed by an Inverse Discrete Fourier Transform (IDFT) which may be implemented very efficiently as an Inverse Fast Fourier Transform (IFFT). Therefore, the receiver may only need a FFT to reverse this operation.

Incoming serial data may first be converted from serial to parallel and grouped into x bits each to form a complex number. The number x may determine the signal constellation of the corresponding subcarrier, such as 16 Quadrature Amplitude Modulation. The complex number may be modulated in a baseband fashion by the IFFT and converted back to serial data for transmission. A guard symbol may be inserted between symbols to avoid inter-symbol interference (ISI) caused by multi-path distortion. The discrete symbols may be converted to analog and low-pass filtered for radio frequency (RF) up-conversion. The receiver then simply performs the inverse process of the transmitter.

According to the theorems of the Fourier Transform the rectangular pulse shape may lead to a sin(x)/x type of spectrum of the subcarriers, as illustrated in FIG. 1. The spectrums of the subcarriers overlap. The reason why the information transmitted over the carriers may be separated is the orthogonality relation. By using an IFFT for modulation, the spacing of the subcarriers may be chosen such that at the frequency where a received signal is evaluated (indicated by letters A-E in FIG. 1) all other signals may be zero.

In a packet communication system, data that is communicated may first be packetized into packets of data, and the data packets, once formed, may then be communicated, sometimes at discrete intervals. Once delivered to a receiving station, the information content of the data may be ascertained by concatenating the information parts of the packets together. Packet communication systems generally make efficient use of communication channels as the communication channels need only to be allocated pursuant to a particular communication session only for the period during which the data packets are communicated. Packet communication channels may sometimes be shared communication channels that are shared by separate sets of communication stations between which separate communication services are concurrently effectuated.

A structured data format is set forth in the present promulgation of the operating specification. The data format of a data packet formed in conformity with standards, such as the ultra-wideband WiMedia or ECMA-368/369, may include a preamble part and a payload part. Other packet communication systems analogously format data into packets that may also include a preamble part and a payload part. The payload part of the packet may contain the information that is to be communicated. That is to say, the payload part may be non-determinative. Conversely, the preamble part of the data packet may not contain the informational content that is to be communicated but, rather, may include determinative data that is used for other purposes. In particular, the preamble part of a WiMedia or ECMA-368/369 packet preamble may include three parts, a packet sync sequence, a frame sync sequence, and a channel estimation sequence. The packet sync sequence and frame sync sequence may be of a length of twenty-four OFDM symbols, and the channel estimation sequence may be of a length of six OFDM symbols. Collectively, the sequences may be of a time length of 9,375 microseconds.

Within the WiMedia PHY layer, implementation may use OFDM as the underlying modulation technique. At its core, it may use 128 unique frequency bins, or "tones," on which it may modulate information. Of these 128 tones, 6 may be NULL tones that carry no information, 12 may be pilot tones that contain data used for tracking, 100 may be data tones which carry the packet payload and there may be 10 guard tones.

However, there is an ongoing desire to increase OFDM transmission data rates and improving system robustness.

SUMMARY

Certain aspects provide a method for increasing data rates and improving robustness in a wireless communication system. The method generally includes identifying a set of guard tones for wireless Orthogonal Frequency Division Multiplexing (OFDM) signals, encoding data for OFDM transmission, identifying a preferred puncture pattern to puncture the encoded data, puncturing the encoded data with the preferred puncture pattern, and transmitting the punctured encoded data, wherein a portion of the punctured encoded data is transmitted on a portion of the set of guard tones.

Certain aspects provide a method for wireless communications. The method generally includes encoding data for Orthogonal Frequency Division Multiplexing (OFDM) transmission using a set of data tones, puncturing the encoded data with a puncture pattern to remove a set of bits from the encoded data, transmitting the punctured encoded data, wherein a portion of the punctured encoded data is transmitted using at least a portion of a set of guard tones separate from the set of data tones.

Certain aspects provide an apparatus for increasing data rates and improving robustness in a wireless communication system. The apparatus generally includes an identifier for identifying a set of guard tones for wireless Orthogonal Frequency Division Multiplexing (OFDM) signals, an encoder for encoding data for OFDM transmission, an identifier for identifying a preferred puncture pattern to puncture the encoded data, a device for puncturing the encoded data with the preferred puncture pattern, and a transmitter for transmitting the punctured encoded data, wherein a portion of the punctured encoded data is transmitted on a portion of the set of guard tones.

Certain aspects provide an apparatus for wireless communications. The apparatus generally includes an encoder for encoding data for Orthogonal Frequency Division Multiplexing (OFDM) transmission using a set of data tones, a device for puncturing the encoded data with a puncture pattern to remove a set of bits from the encoded data, and a transmitter for transmitting the punctured encoded data, wherein a portion of the punctured encoded data is transmitted using at least a portion of a set of guard tones separate from the set of data tones.

Certain aspects provide an apparatus for increasing data rates and improving robustness in a wireless communication system. The apparatus generally includes means for identifying a set of guard tones for wireless Orthogonal Frequency Division Multiplexing (OFDM) signals, means for encoding data for OFDM transmission, means for identifying a preferred puncture pattern to puncture the encoded data; means for puncturing the encoded data with the preferred puncture pattern, and means for transmitting the punctured encoded data, wherein a portion of the punctured encoded data is transmitted on a portion of the set of guard tones.

Certain aspects provide an apparatus for wireless communications. The apparatus generally includes means for encoding data for Orthogonal Frequency Division Multiplexing (OFDM) transmission using a set of data tones, means for puncturing the encoded data with a puncture pattern to remove a set of bits from the encoded data, and means for transmitting the punctured encoded data, wherein a portion of the punctured encoded data is transmitted using at least a portion of a set of guard tones separate from the set of data tones.

Certain aspects provide a computer-program product for increasing data rates and improving robustness in a wireless communication system. The computer-program product includes a computer readable medium encoded with instructions executable to identify a set of guard tones for wireless Orthogonal Frequency Division Multiplexing (OFDM) signals, encode data for OFDM transmission, identify a preferred puncture pattern to puncture the encoded data, puncture the encoded data with the preferred puncture pattern, and transmit the punctured encoded data, wherein a portion of the punctured encoded data is transmitted on a portion of the set of guard tones.

Certain aspects provide a computer-program product for wireless communications. The computer-program product includes a computer readable medium encoded with instructions executable to encode data for Orthogonal Frequency Division Multiplexing (OFDM) transmission using a set of data tones, puncture the encoded data with a puncture pattern to remove a set of bits from the encoded data, and transmit the punctured encoded data, wherein a portion of the punctured encoded data is transmitted using at least a portion of a set of guard tones separate from the set of data tones.

Certain aspects provide a wireless node for increasing data rates and improving robustness in a wireless communication system. The wireless node generally includes at least one antenna, an identifier for identifying a set of guard tones for wireless Orthogonal Frequency Division Multiplexing (OFDM) signals, an encoder for encoding data for OFDM transmission, an identifier for identifying a preferred puncture pattern to puncture the encoded data, a device for puncturing the encoded data with the preferred puncture pattern, and a transmitter for transmitting via the at least one antenna the punctured encoded data, wherein a portion of the punctured encoded data is transmitted on a portion of the set of guard tones.

Certain aspects provide a wireless node for wireless communications. The wireless node generally includes at least one antenna, an encoder for encoding data for Orthogonal Frequency Division Multiplexing (OFDM) transmission using a set of data tones, a device for puncturing the encoded data with a puncture pattern to remove a set of bits from the encoded data, and a transmitter for transmitting via the at least one antenna the punctured encoded data, wherein a portion of the punctured encoded data is transmitted using at least a portion of a set of guard tones separate from the set of data tones.

BRIEF DESCRIPTION OF THE DRAWINGS

The novel features believed characteristic of the disclosure are set forth in the appended claims. The disclosure itself, however, as well as a preferred mode of use, further objects and advantages thereof, will best be understood by reference to the following detailed description of an illustrative aspect when read in conjunction with the accompanying drawings, wherein:

FIG. 6 illustrates an example puncture pattern (R=1/2) in accordance with certain aspects of the present disclosure;

FIG. 7 illustrates an example puncture pattern (R=5/8) in accordance with certain aspects of the present disclosure;

FIG. 8 illustrates an example puncture pattern (R=3/4) in accordance with certain aspects of the present disclosure;

FIG. 9 illustrates an example puncture pattern (R=2/3) in accordance with certain aspects of the present disclosure;

FIG. 10 illustrates an example puncture pattern (R=4/5) in accordance with certain aspects of the present disclosure;

FIG. 11 illustrates an example puncture pattern (Preferred R=5/11) in accordance with certain aspects of the present disclosure;

FIG. 12 illustrates an example puncture pattern (Preferred R=8/11) in accordance with certain aspects of the present disclosure;

FIG. 13 illustrates a qualified puncture pattern (qualified R=5/11), a data puncture pattern, and a guard tone puncture pattern in accordance with certain aspects of the present disclosure;

FIG. 14 illustrates a qualified puncture pattern (qualified R=25/44), a data puncture pattern, and a guard tone puncture pattern in accordance with certain aspects of the present disclosure;

FIG. 15 illustrates a qualified puncture pattern (qualified R=15/22), a data puncture pattern, and a guard tone puncture pattern in accordance with certain aspects of the present disclosure;

FIG. 16 illustrates a qualified puncture pattern (qualified R=20/33), a data puncture pattern, and a guard tone puncture pattern in accordance with certain aspects of the present disclosure;

FIG. 17 illustrates a qualified puncture pattern (qualified R=8/11), a data puncture pattern, and a guard tone puncture pattern in accordance with certain aspects of the present disclosure.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein one skilled in the art should appreciate that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Figure 1:
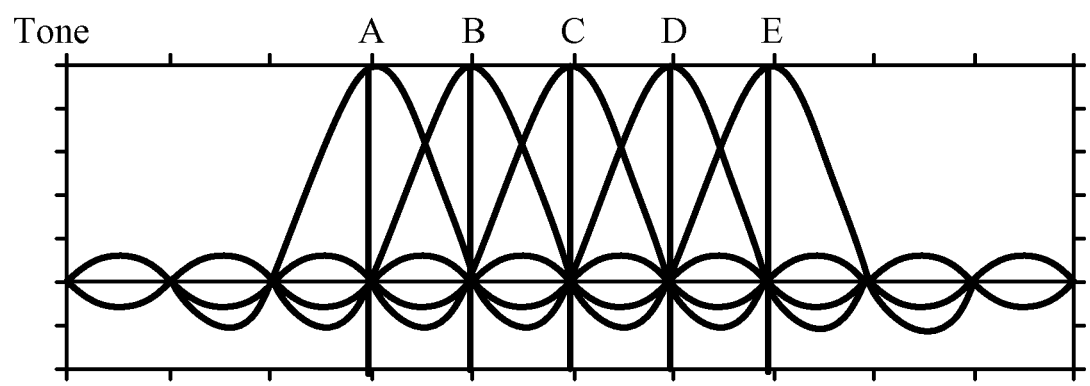
FIG. 1 illustrates an example OFDM signal.
Figure 2:
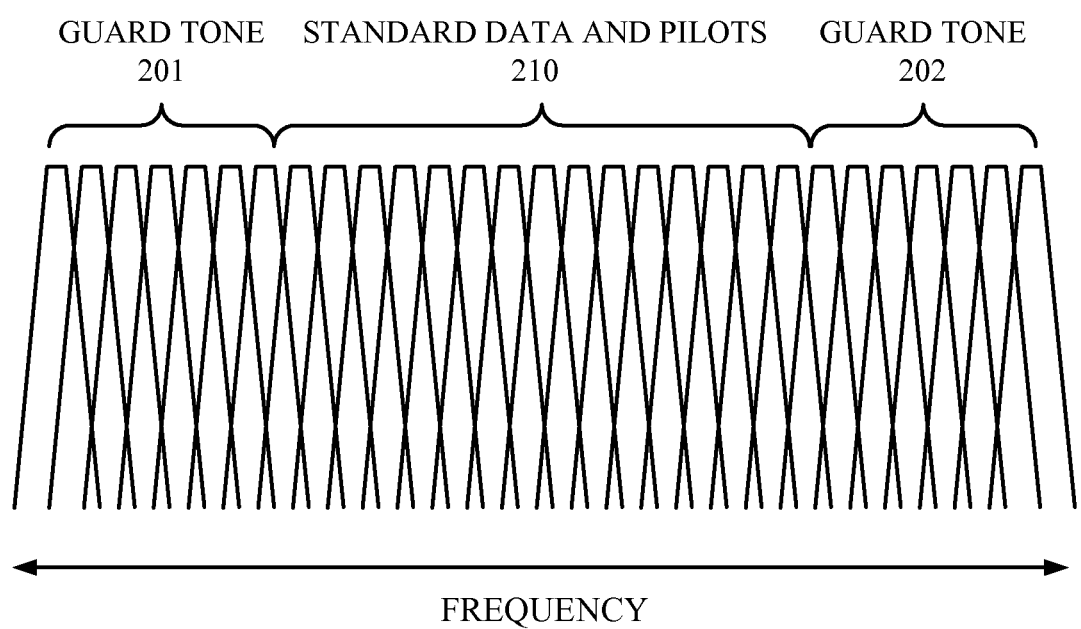
FIG. 2 illustrates the relationship between the main and side channels in the frequency domain.

FIG. 2 illustrates the relationship between the main and side channels in the frequency domain. The guard tones 201, 202 may modulate data beside the main data and pilot tones 210 in the frequency domain. In practice, the guard tones may be viewed as a channel to communicate information between two devices in the network without causing the devices to be non-compliant with the standard specifications for the data tones and pilot tones.

Guard tones may be bits that are left open by the standard for use by developers in customizing their designs. In the example illustrated in FIG. 2, the guard tones 201, 202 lie completely outside the frequencies occupied by the standard data and pilots tones.

Figure 3:
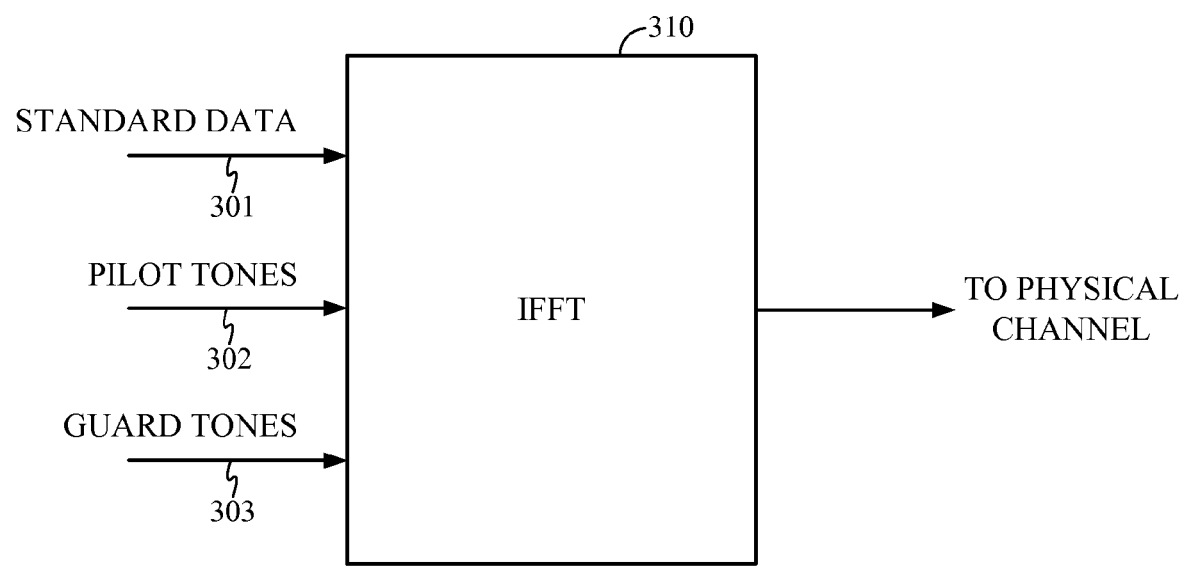
FIG. 3 illustrates an Inverse Fast Fourier Transform (IFFT) in accordance with certain aspects of the present disclosure.

FIG. 3 illustrates an Inverse Fast Fourier Transform (IFFT) in accordance with certain aspects of the present disclosure. The main data components that may be fed into the IFFT 310 are the standard data 301, the pilot tones 302, and guard tones 303. The standard data 301 may include the information contents of the signal. The pilot tones 302 are known tones that may be used to inform the receiver as to the phase of the signal. Pilot tones may be used for phase offset tracking and correction, wherein the phase of the reference pilot tones may be compared with the received tones to estimate and correct any phase offset at the receiver, thus correcting any clock mismatch between the transmitter and receiver.

The guard tones 303 may be similar to those defined in the WiMedia or ECMA-368/369, which is hereby incorporated by reference. There may be 10 guard tones in the standard that may be located on either edge of the frequency band. These tones may be transmitted upon, but what is modulated on them may be a copy of some of the data tones. The present disclosure uses these guard tones, or a subset thereof, to increase the robustness of wireless communication.

Figure 4:
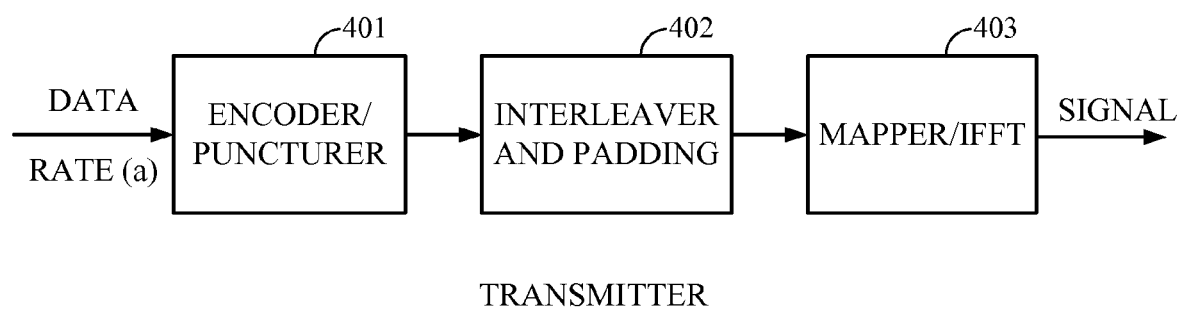
FIG. 4 illustrates a method for transmitting wireless data.

FIG. 4 illustrates a method for transmitting wireless data. Data may be fed into the Encoder/puncturer 401 at code rate a. The code rate may be expressed as a ratio of the number of bits k input into the encoder to the number of channel symbols n output by the encoder in a given encoder cycle.

Punctured codes may be a common way of achieving higher code rates (i.e., larger ratios of k to n). Punctured codes may be created by first encoding data using a rate 1/n encoder and then deleting some of the channel symbols at the output of the encoder. This process of deleting channel output symbols is called puncturing.

For example, to create a rate 3/4 code from a rate 1/2 code, one may delete channel symbols in accordance with the following puncturing pattern:

$$P = \begin{pmatrix} 1 & 0 & 1 \\ 1 & 1 & 0 \end{pmatrix}$$

where a '1' indicates that a channel symbol is transmitted, and a '0' indicates that a channel symbol is deleted. To see how this makes the rate 3/4, think of each column as corresponding to a bit input into the encoder, and each '1' in the table as corresponding to an output channel symbol. There are three columns in the table, and four '1's.

The punctured code may be fed into the interleaver 402 and pad bits may be added if necessary. From there, the code may be mapped to a physical transmission signal by the mapper 403.

For certain aspects of the present disclosure, the depunctured bits may be used on the guard tones while preserving the WiMedia data flow on the data tones as discussed below herein.

Figure 18:
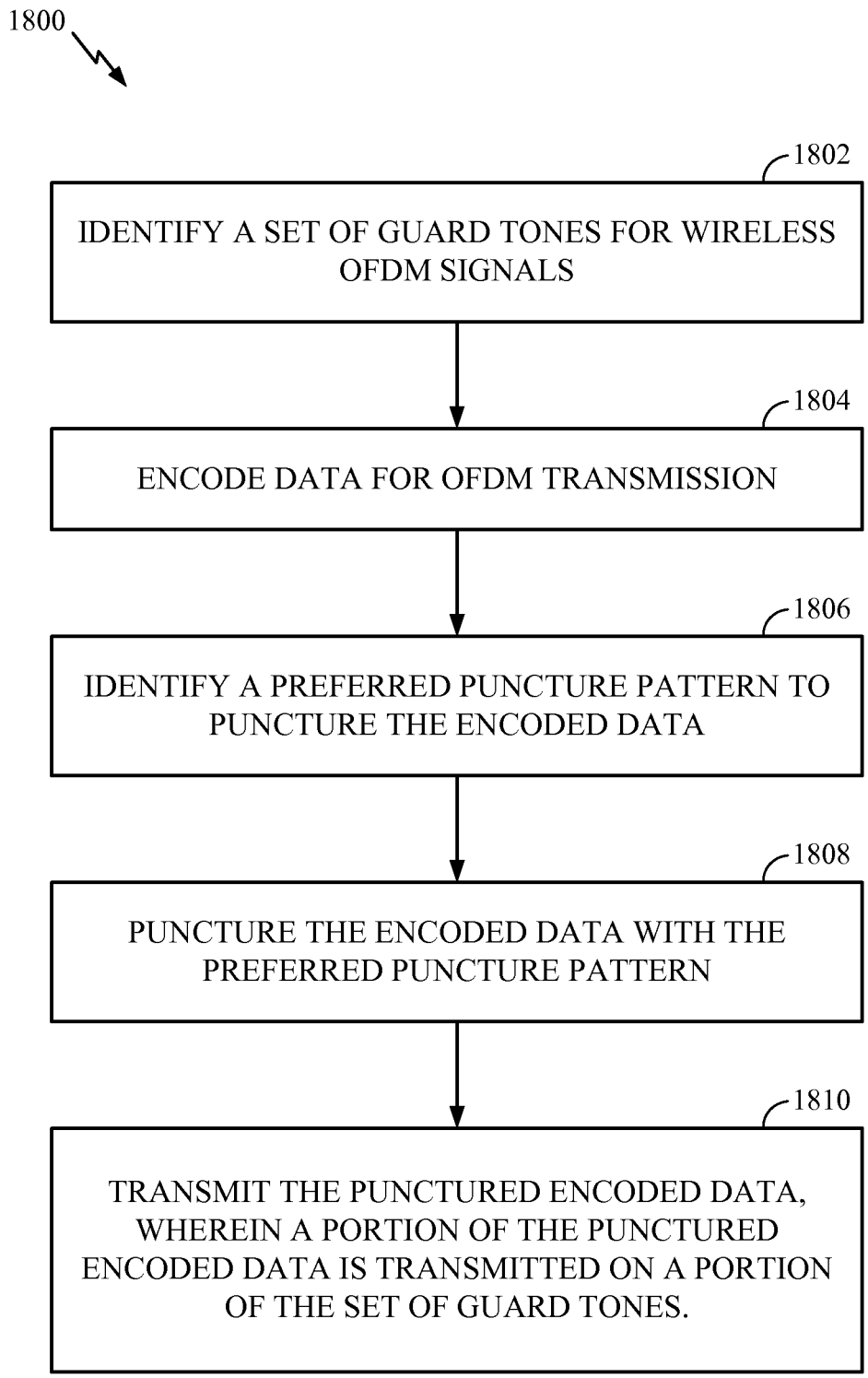
FIG. 18 illustrates example operations for using guard tones in OFDM systems to increase data rate and improve robustness in accordance with certain aspects of the present disclosure.

FIG. 18 illustrates example operations for using guard tones in OFDM systems to increase the data rate and improve robustness in accordance with certain aspects of the present disclosure. At 1802, the transmitter may identify a set of guard tones for wireless OFDM signals. At 1804, the transmitter may encode the data for OFDM transmission. At 1806, the transmitter may identify a preferred puncture pattern to puncture the encoded data. At 1808, the transmitter may puncture the encoded data with the preferred puncture pattern. At 1810, the transmitter may transmit the punctured encoded data, wherein a portion of the punctured encoded data may be transmitted on a portion of the set of guard tones.

Figure 5:
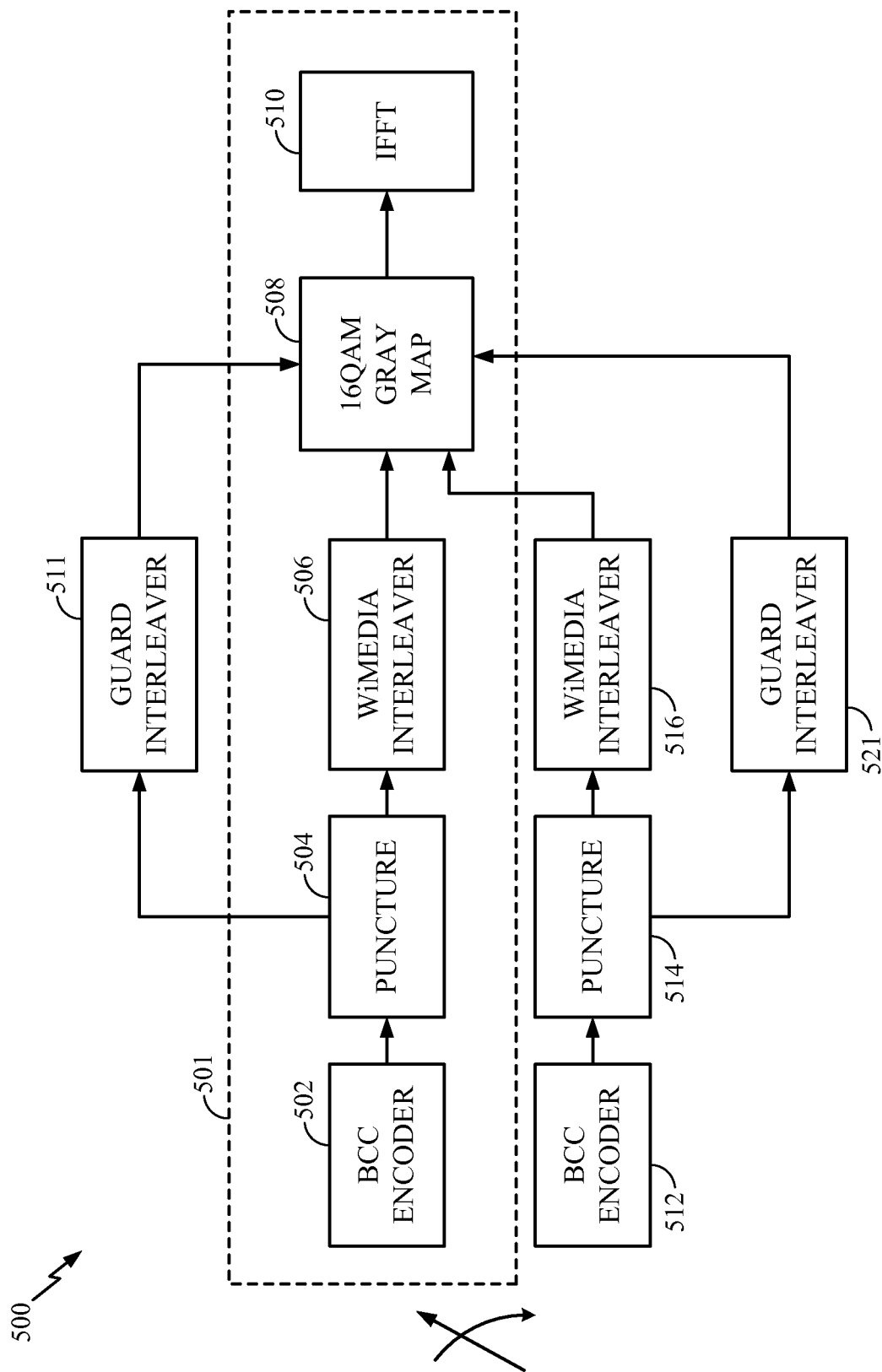
FIG. 5 illustrates a block diagram of the transmitter in accordance with certain aspects of the present disclosure.

FIG. 5 illustrates a block diagram of a transmitter 500 that may be implemented in a multi-band OFDM (Orthogonal Frequency Division Multiplexing) communication system in accordance with certain aspects of the present disclosure. The transmitter 500 may include a parallel bit-interleaved convolutional code (BICC) structure in which several PHY Cores 501 are replicated and mapped to a 16 QAM constellation. This duplication may allow for higher data rates than those currently supported by the WiMedia PHY layer. The transmitter 500 may include a binary convolutional code (BCC) encoder 502, a puncture module 504, a WiMedia interleaver 506, a mapper 508, and an inverse fast Fourier Transformer (IFFT) 510.

The BCC encoder 502 may receive input bits and may convolutionally encode the input bits to generate coded data. The puncture module 504 may puncture the coded data by a selected puncture pattern (e.g., puncture matrix) and thus, may reduce the number of transmitted bits and increase the coding rate. The puncture pattern may include two separate puncture patterns (e.g., data puncture pattern and guard puncture pattern) in parallel and may be used to optimize the resultant code. In other words, the coded data may be punctured by a data puncture pattern (for mapping to the data tones) and, in parallel, may be punctured by a guard puncture pattern (for mapping to the guard tones).

The output of the data puncture pattern of the puncture module 504 may be provided to the WiMedia interleaver 506 for bit interleaving as specified in the WiMedia standard. For example, the WiMedia standard specifies that bit interleaving may be performed in three stages: 6 OFDM symbol block interleaver, tone intra-OFDM symbol block interleaver, and intra tone cyclic shifter. Also, the output of the guard puncture pattern of the puncture module 504 may be provided to a Guard interleaver 511. The Guard interleaver 511 may be similar to the WiMedia interleaver 506 including the three stage interleaver. However, the differences between the Guard interleaver 511 and WiMedia interleaver 506 may include the size of each block and the cyclic shift value. For example, the 6 OFDM symbol block interleaver may have block sizes of 20 bits (6*20 bits). The guard tone interleaver may have block sizes of 5 bits (4*5 bits). The cyclic shifter may have shift value 3 (as compared to 33 for the highest WiMedia rates).

The output of the WiMedia interleaver 506 and the Guard interleaver 511 may be provided to the mapper 508 that is operable to map the coded and interleaved data sequence onto a complex constellation, e.g., QPSK (Quartinary Phase Shift Keying) symbols, 16 QAM symbols according to the Gray code constellation mapping. Additionally, as previously noted, the transmitter 500 may include a parallel bit-interleaved convolutional code (BICC) structure in which several PHY Cores 501 are replicated and mapped to a 16 QAM constellation 508. This duplication may allow for higher data rates than those currently supported by the WiMedia PHY layer. Accordingly, the transmitter 500 may further include a BCC encoder 512 (similar to the BCC encoder 502), a puncture module 514 (similar to the puncture module 504), a WiMedia interleaver 516 (similar to the WiMedia interleaver 506), and a Guard interleaver 521 (similar to the Guard interleaver 511). The output of the WiMedia interleaver 516 and the Guard interleaver 521 are also provided to the mapper 508 for mapping onto the complex constellation.

Once mapped, the symbols may be provided to the IFFT 510 for converting the domain of the symbols to the time domain. The transformed symbols are processed and modulated for transmission on the radio channel. It is understood that the transmitter 500 may include various other components or functions, such as a D/A converter and a radio frequency (RF) module, but the depiction of the transmitter is simplified to facilitate a better understanding of the disclosed aspects.

The WiMedia specification uses puncture patterns that produce coded rates of R=1/2, R=5/8 and R=3/4. These are illustrated in FIGS. 6-8, respectively. Additionally, other desirable coded rates include R=2/3 and R=4/5. FIGS. 9 and 10 illustrate the preferred puncture patterns (in terms of minimum free distance) for these coded rates R=2/3 and R=4/5, respectively.

When used in the parallel BICC structure (in FIG. 5) within the WiMedia data flow (guard tone replication), the WiMedia puncture patterns (R=1/2, R=5/8, R=3/4) may produce data rates of 640 Mbps, 800 Mbps, 960 Mbps, respectively. Additionally, the preferred R=2/3 and R=4/5 within the WiMedia data flow may produce data rates of 853.3 Mbps and 1024 Mbps, respectively.

However, in general, if guard tones carry coded bits, rather than using simple replication of data tones, a more robust system may be obtained. Since there are 10 guard tones in a WiMedia compliant OFDM system, 10% more coded data may be placed over these tones than if the system only used 100 tones for coded data. The effective puncture rates may change according to the following table:

| Puncture Rate (data tones) | Effective Puncture Rate (data + guard) |
| --- | --- |
| 1/2 | 5/11 |
| 5/8 | 25/44 |
| 3/4 | 15/22 |
| 2/3 | 20/33 |
| 4/5 | 8/11 |

One way to define a new effective puncture pattern may be to search for a preferred puncture pattern (e.g., in terms of minimum free distance and/or nearest neighbors). FIGS. 11 and 12 illustrate examples of such patterns for R=5/11 and R=8/11, respectively.

However, a more practical approach to achieve "effective" (albeit possibly less than optimal) puncture rates may be to use the puncture patterns defined by WiMedia (R=1/2, R=5/8, R=3/4) (FIGS. 6-8) or preferred (R=2/3, R=4/5) (FIGS. 9-10) puncture patterns as a base and produce qualified patterns that may be a superset of this base. More specifically, if the base pattern is replicated N times, then the effective rate may be produced by depuncturing some of the previously punctured bits. The net effect may be to have a data tone pattern, which may be unchanged from the base and a guard tone pattern (which uses some of the discarded bits from the data pattern). These "qualified" patterns and the breakdown into the data pattern (unchanged from the WiMedia/preferred base) and the guard pattern are illustrated in FIGS. 13-17. Please note that column-wise rotations of these puncture patterns (in FIGS. 13-17) result in equivalent puncture patterns that have the same minimum free distance property.

For example, in FIG. 13, illustrated is a qualified puncture pattern 1302 that may be used to achieve an effective puncture rate R=5/11 according to certain aspects of the present disclosure. The qualified puncture pattern 1302 may be generated by replicating the base pattern P=[1; 0; 1] illustrated in FIG. 6 (e.g., WiMedia R=1/2 puncture pattern) five times and then depuncturing 1303 one of the previously punctured bits. Accordingly, the net effect may result in a data puncture pattern 1304 which is unchanged from the base pattern, and a guard puncture pattern 1306 which uses one of the previously punctured or discarded bits 1308 from the data pattern.

The qualified puncture patterns illustrated in FIGS. 13-17 may be optimized based on various criteria. These criteria include maximizing the minimum free distance and minimizing the number of nearest neighbors. The free distance and nearest neighbor profiles for the preferred qualified puncture patterns are discussed below.

For certain aspects of the present disclosure, the free distance and nearest neighbor profile for the qualified R=5/11 puncture pattern (in FIG. 13) may be chosen as follows, where d=free distance, NN=nearest neighbor, Pbest=preferred puncture pattern, dist_profile=distance profile, and the NN matrix corresponding to various phases:

$$d := [10\ 11\ 12\ 13\ 14]$$

$$NN = [8\ 24\ 41\ 63\ 126]$$

$$Pbest = \begin{pmatrix} 1 & 1 & 1 & 1 & 1 \\ 1 & 0 & 0 & 0 & 0 \\ 1 & 1 & 1 & 1 & 1 \end{pmatrix}$$

$$\text{dist\_profile} = [10\ 11\ 12\ 13\ 14]$$

$$NN = \begin{pmatrix} 0 & 2 & 6 & 7 & 15 \\ 3 & 6 & 8 & 13 & 33 \\ 1 & 7 & 5 & 15 & 23 \\ 1 & 6 & 15 & 15 & 31 \\ 3 & 3 & 7 & 13 & 24 \end{pmatrix}$$

For certain aspects of the present disclosure, the free distance and nearest neighbor profile for the qualified R=8/11 puncture pattern (in FIG. 17) may be chosen as follows, where d=free distance, NN=nearest neighbor, Pbest=preferred puncture pattern, dist_profile=distance profile, and the NN matrix corresponding to various phases:

$$d = [5\ 6\ 7\ 8\ 9]$$

$$NN = [14\ 61\ 276\ 1300\ 6179]$$

$$Pbest = \begin{pmatrix} 0 & 1 & 1 & 1 & 0 & 1 & 1 & 1 \\ 1 & 0 & 0 & 0 & 1 & 0 & 0 & 0 \\ 0 & 1 & 1 & 0 & 0 & 1 & 0 & 0 \end{pmatrix}$$

$$\text{dist\_profile} = [5\ 6\ 7\ 8\ 9]$$

$$NN = \begin{pmatrix} 2 & 6 & 37 & 147 & 739 \\ 0 & 3 & 8 & 40 & 222 \\ 1 & 4 & 18 & 82 & 377 \\ 2 & 18 & 69 & 295 & 1458 \\ 2 & 8 & 32 & 189 & 847 \end{pmatrix}$$

$$\begin{matrix} 1 & 5 & 15 & 67 & 366 \\ 4 & 11 & 68 & 314 & 1423 \\ 2 & 6 & 29 & 166 & 747 \end{matrix}$$

For certain aspects of the present disclosure, the free distance and nearest neighbor profile for the qualified R=15/22 puncture pattern (in FIG. 15) may be chosen as follows, where d=free distance, NN=nearest neighbor, Pbest=preferred puncture pattern, dist_profile=distance profile, and the NN matrix corresponding to various phases:

$$d = [5\ 6\ 7\ 8\ 9]$$

$$NN = [7\ 39\ 201\ 795\ 2977]$$

$$Pbest = \begin{pmatrix} 1 & 1 & 0 & 1 & 1 & 0 & 1 & 0 & 0 & 1 & 0 & 0 & 1 & 0 & 0 \\ 1 & 0 & 0 & 1 & 0 & 0 & 1 & 0 & 0 & 1 & 0 & 0 & 1 & 0 & 0 \\ 0 & 1 & 1 & 0 & 1 & 1 & 0 & 1 & 1 & 0 & 1 & 1 & 0 & 1 & 1 \end{pmatrix}$$

$$\text{dist\_profile} = [5\ 6\ 7\ 8\ 9]$$

$$NN = \begin{pmatrix} 0 & 0 & 7 & 4 & 44 \\ 0 & 2 & 2 & 20 & 53 \\ 0 & 5 & 9 & 47 & 190 \\ 0 & 1 & 6 & 18 & 62 \\ 0 & 1 & 7 & 30 & 112 \\ 1 & 6 & 15 & 64 & 321 \\ 0 & 3 & 7 & 29 & 121 \\ 0 & 7 & 40 & 109 & 503 \\ 0 & 4 & 12 & 60 & 235 \\ 0 & 1 & 5 & 27 & 101 \\ 0 & 5 & 33 & 113 & 405 \\ 0 & 1 & 16 & 61 & 209 \\ 0 & 2 & 5 & 21 & 74 \\ 0 & 4 & 17 & 55 & 206 \\ 0 & 2 & 10 & 43 & 167 \end{pmatrix}$$

For certain aspects of the present disclosure, the free distance and nearest neighbor profile for the qualified R=25/44 puncture pattern (in FIG. 14) may be chosen as follows, where d=free distance, NN=nearest neighbor, Pbest=preferred puncture pattern, dist_profile=distance profile, and the NN matrix corresponding to various phases:

$$d = [7\ 8\ 9\ 10\ 11]$$

$$NN = [9\ 108\ 190\ 513\ 1413]$$

$$Pbest =$$

$$\begin{pmatrix} 1 & 1 & 1 & 0 & 1 & 1 & 0 & 1 & 0 & 1 & 1 & 0 & 1 & 0 & 1 & 1 & 0 & 1 & 0 & 1 & 1 & 0 & 1 & 0 & 1 \\ 1 & 0 & 1 & 0 & 1 & 1 & 0 & 1 & 0 & 1 & 1 & 1 & 1 & 0 & 1 & 1 & 1 & 1 & 0 & 1 & 1 & 1 & 1 & 0 & 1 \\ 0 & 1 & 0 & 1 & 0 & 0 & 1 & 0 & 1 & 0 & 0 & 1 & 0 & 1 & 0 & 0 & 1 & 0 & 1 & 0 & 0 & 1 & 0 & 1 & 0 \end{pmatrix}$$

It is understood that the qualified puncture patterns illustrated in FIGS. 13-17 are mere examples and that numerous other puncture patterns may be used in accordance with other various criteria.

In the current WiMedia PHY layer implementation, the guard tones may replicate a subset of the data tones. As a result, a receiver may potentially ignore the guard tones (call this "SYSTEM A") and still decode a packet provided the signal-to-noise ratio (SNR) is high enough. Alternatively, a receiver could use the duplicate information on the guard tones and improve its performance (call this "SYSTEM B") (e.g., decode the same packet at a lower SNR). An elegant way for next generation PHY layer implementations to achieve greater robustness, may be to remain within the existing data flow.

However, instead of simple replication of data tones, mapping depunctured bits (coded data that is normally discarded to produce a high rate code), may result in a system that may be even more robust than guard tone replication. In fact, the same property at the receiver may hold, the guard tones may be ignored to produce a baseline level of performance (call this "SYSTEM C", and may be used to produce a higher performing receiver (call this "SYSTEM D"). A unique property of the present disclosure may be that the data flow on the data tones is compatible with the baseline "SYSTEM A". This may allow for a natural extension to the current WiMedia PHY layer specification and may allow improved robustness at higher data rates that the next generation WiMedia PHY layer specification may require.

In the system proposed in the current disclosure, the data may be thought to be punctured by two separate puncture patterns in parallel (e.g., a data puncture pattern and a guard puncture pattern). The output of the data puncture pattern may be put through a first interleaver and mapped to the data tones. As a result, the contents of the data tones for "SYSTEM A," "SYSTEM B," "SYSTEM C" and "SYSTEM D" may be identical. The output of the guard puncture pattern may be put through a secondary interleaver and then mapped to the guard tones. The coded bits (which may include one or more of the discarded bits from the data pattern) that are carried on the guard tones may be used to produce a higher performing receiver such as "SYSTEM D." Further, using a parallel bit-interleaved convolutional code (BICC) structure in which several PHY Cores are replicated and mapped to a 16 QAM constellation, may allow for higher data rates than those currently supported by the WiMedia PHY layer.

Figure 18A:
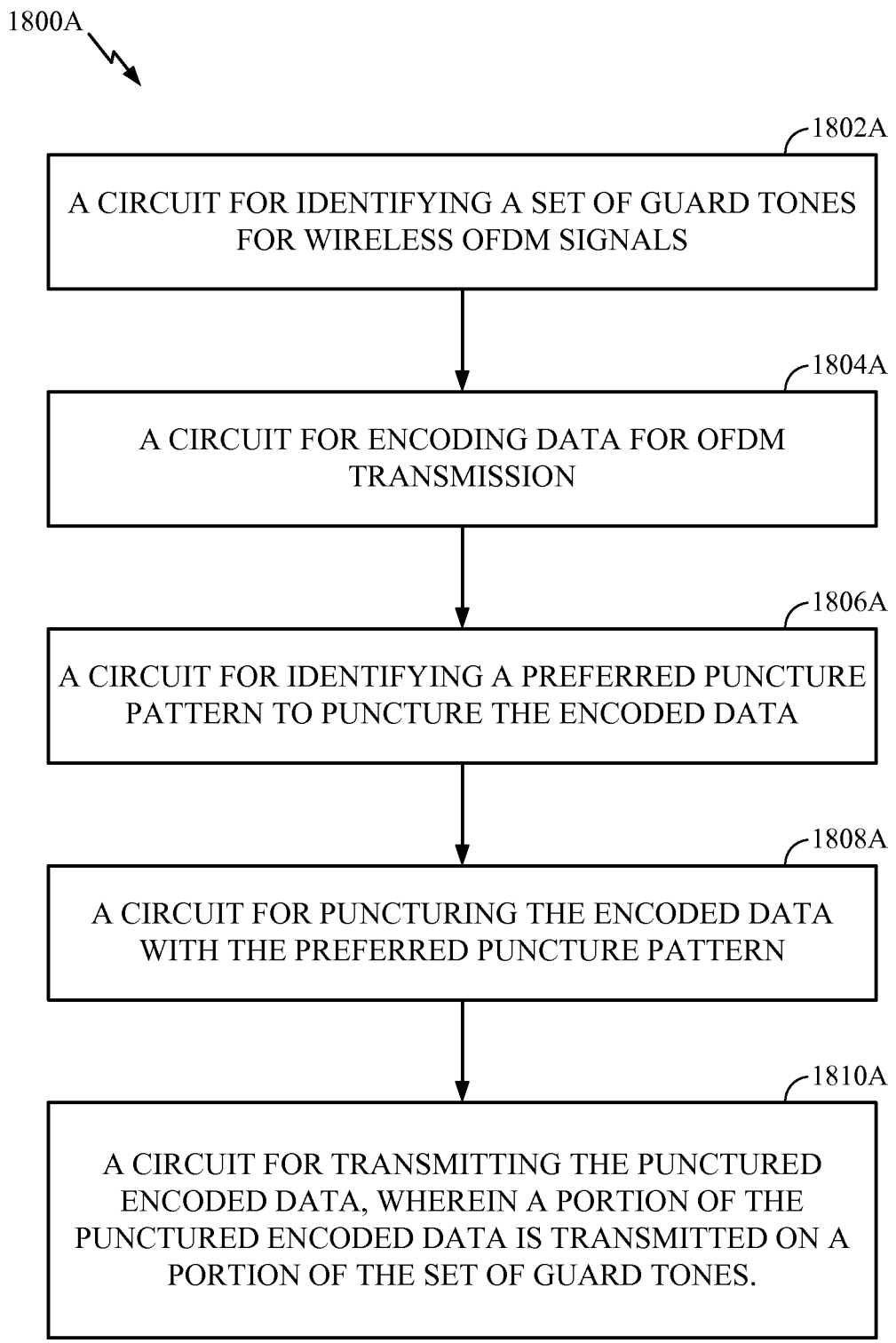
FIG. 18A illustrates example components capable of performing the operations illustrated in FIG. 18.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 1802-1810A, illustrated in FIG. 18 correspond to circuit blocks 1802A-1810A, illustrated in FIG. 18A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for increasing data rates and improving robustness in a wireless communication system having Orthogonal Frequency Division Multiplexing (OFDM) with guard tones and data tones, the method comprising:
    encoding data for OFDM transmission;
    identifying a first puncture pattern and a second puncture pattern to puncture the encoded data;
    puncturing the encoded data with the first puncture pattern and with the second puncture pattern; and
    transmitting the punctured encoded data, wherein a portion of the punctured encoded data punctured with the first puncture pattern is transmitted on a portion of a set of guard tones, and wherein a portion of the encoded data punctured with the second puncture pattern is transmitted on a portion of a set of data tones.

2. A method for increasing data rates and improving robustness in a wireless communication system having Orthogonal Frequency Division Multiplexing (OFDM) with guard tones and data tones, the method comprising:
    encoding data for OFDM transmission, wherein said encoding includes encoding the data with a first encoder and a second encoder;
    puncturing the encoded data with a preferred puncture pattern, wherein said puncturing includes puncturing the encoded data from the first encoder and puncturing the encoded data from the second encoder; and
    transmitting the punctured encoded data, wherein said transmitting includes transmitting the punctured encoded data from the first encoder and the punctured data from the second encoder on a portion of the set of guard tones.

3. A method for wireless communications, comprising:
    encoding data for Orthogonal Frequency Division Multiplexing (OFDM) transmission using a set of data tones;
    puncturing the encoded data with a puncture pattern to remove a set of bits from the encoded data, wherein said puncturing includes generating a qualified puncture pattern that comprises a superset of a base puncture pattern, and puncturing the encoded data with the qualified puncture pattern; and
    transmitting the punctured encoded data, wherein a portion of the punctured encoded data is transmitted using at least a portion of a set of guard tones separate from the set of data tones,
    wherein generating a qualified puncture pattern that comprises a superset of a base puncture pattern comprises:
    determining at least one of a free distance and nearest neighbor profile for one or more puncture patterns; and
    selecting a puncture pattern as a qualified puncture pattern based on the determination.

4. The method of claim 3, wherein the portion of punctured encoded data comprises symbols removed from the encoded data via the puncturing.

5. The method of claim 3, wherein:
    the base puncture pattern corresponds to a first predetermined puncture rate; and
    the qualified puncture pattern corresponds to a second predetermined puncture rate that is less than the first predetermined puncture rate.

6. An apparatus for increasing data rates and improving robustness in a wireless communication system, comprising:
    an encoder for encoding data for Orthogonal Frequency Division Multiplexing (OFDM) transmission in an OFDM communication having a set of data tones and a set of guard tones;
    an identifier for identifying a first puncture pattern and a second puncture pattern to puncture the encoded data;
    a device for puncturing the encoded data with the first puncture pattern;
    a device for puncturing the encoded data with the second puncture pattern; and a transmitter for transmitting the punctured encoded data, wherein a portion of the encoded data punctured with the first puncture pattern is transmitted on a portion of the set of guard tones; and wherein a portion of the encoded data punctured with the second puncture pattern is transmitted on a portion of the set of data tones.

7. An apparatus for increasing data rates and improving robustness in a wireless communication system, comprising:
    an encoder for encoding data for Orthogonal Frequency Division Multiplexing (OFDM) transmission in an OFDM communication having a set of data tones and a set of guard tones, wherein the encoder for encoding data for OFDM transmission includes an encoder for encoding the data with a first encoder and a second encoder;
    an identifier for identifying preferred puncture pattern having a first puncture pattern to uncture the encoded data and a second puncture pattern to puncture the encoded data;
    a device for puncturing the encoded data with the preferred puncture pattern, wherein the device for puncturing the encoded data with the preferred puncture pattern includes a circuit for puncturing the encoded data from the first encoder and a circuit for puncturing the encoded data from the second encoder; and a transmitter for transmitting the punctured encoded data, wherein the transmitter for transmitting the punctured encoded data includes a transmitter for transmitting the punctured encoded data from the first encoder and the punctured encoded data from the second encoder on a portion of the set of guard tones.

8. An apparatus for wireless communications, comprising:
an encoder for encoding data for Orthogonal Frequency Division Multiplexing (OFDM) transmission using a set of data tones;
a device for puncturing the encoded data with a puncture pattern to remove a set of bits from the encoded data, wherein said device comprises:
   a generator for generating a qualified puncture pattern that comprises a superset of a base puncture pattern; and
   a circuit for puncturing the encoded data with the qualified puncture pattern; and
a transmitter for transmitting the punctured encoded data, wherein a portion of the punctured encoded data is transmitted using at least a portion of a set of guard tones separate from the set of data tones,
wherein the generator for generating a qualified puncture pattern that comprises a superset of a base puncture pattern comprises:
   a device for determining at least one of a free distance and nearest neighbor profile for one or more puncture patterns; and
   a selector for selecting a puncture pattern as a qualified puncture pattern based on the determination.

9. The apparatus of claim 8, wherein the portion of punctured encoded data comprises symbols removed from the encoded data via the puncturing.

10. The apparatus of claim 8, wherein: the base puncture pattern corresponds to a first predetermined puncture rate; and the qualified puncture pattern corresponds to a second predetermined puncture rate that is less than the first predetermined puncture rate.

11. An apparatus for increasing data rates and improving robustness in a wireless communication system, comprising:
means for encoding data for Orthogonal Frequency Division Multiplexing (OFDM) transmission in an OFDM communication having a set of data tones and a set of guard tones;
means for identifying a first puncture pattern to puncture the encoded data;
means for identifying a second puncture pattern to puncture the encoded data;
means for puncturing the encoded data with the first puncture pattern;
means for puncturing the encoded data with the second puncture pattern;
means for transmitting the punctured encoded data, wherein a portion of the punctured encoded data punctured with the first puncture pattern is transmitted on a portion of the set of guard tones, and wherein a portion of the encoded data punctured with the second puncture pattern is transmitted on a portion of a set of data tones.

12. An apparatus for increasing data rates and improving robustness in a wireless communication system, comprising:
means for encoding data for Orthogonal Frequency Division Multiplexing (OFDM) transmission in an OFDM communication having a set of data tones and a set of guard tones;
means for identifying a preferred puncture pattern to puncture the encoded data, wherein the means for encoding data for OFDM transmission includes means for encoding the data with a first encoder and a second encoder;
means for puncturing the encoded data with the preferred puncture pattern, wherein the means for puncturing the encoded data with the preferred puncture pattern includes means for puncturing the encoded data from the first encoder and puncturing the encoded data from the second encoder; and
means for transmitting the punctured encoded data, wherein the means for transmitting the punctured encoded data includes means for transmitting the punctured encoded data from the first encoder and the punctured data from the second encoder on a portion of the set of guard tones.

13. An apparatus for wireless communications, comprising:
means for encoding data for Orthogonal Frequency Division Multiplexing (OFDM) transmission using a set of data tones;
means for puncturing the encoded data with a puncture pattern to remove a set of bits from the encoded data, comprising:
   means for generating a qualified puncture pattern that comprises a superset of a base puncture pattern, and
   means for puncturing the encoded data with the qualified puncture pattern; and
means for transmitting the punctured encoded data, wherein a portion of the punctured encoded data is transmitted using at least a portion of a set of guard tones separate from the set of data tones,
wherein the means for generating a qualified puncture pattern that comprises a superset of a base puncture pattern comprises:
   means for determining at least one of a free distance and nearest neighbor profile for one or more puncture patterns; and
   means for selecting a puncture pattern as a qualified puncture pattern based on the determination.

14. The apparatus of claim 13, wherein the portion of punctured encoded data comprises symbols removed from the encoded data via the puncturing.

15. The apparatus of claim 13, wherein: the base puncture pattern corresponds to a first predetermined puncture rate; and the qualified puncture pattern corresponds to a second predetermined puncture rate that is less than the first predetermined puncture rate.

16. A non-transitory computer-readable medium comprising instructions, which, when executed by a processor apparatus in a wireless communications system, cause the processor apparatus to perform operations carrying out a method for increasing data rates and improving robustness in a wireless communication system having Orthogonal Frequency Division Multiplexing (OFDM) with guard tones and data tones, comprising instructions that cause the processor apparatus to:
encode data for OFDM transmission;
identify first puncture pattern and a second puncture pattern to puncture the encoded data; puncture the encoded data with the first puncture pattern and with the second puncture pattern; and
transmit the punctured encoded data, wherein a portion of the punctured encoded data punctured with the first puncture pattern is transmitted on a portion of a set of guard tones, and wherein a portion of the encoded data punctured with the second puncture pattern is transmitted on a portion of a set of data tones.

* * * * *